(12) United States Patent
Yang et al.

(10) Patent No.: US 7,424,923 B2
(45) Date of Patent: Sep. 16, 2008

(54) MOBILE ROBOT

(75) Inventors: Soo-Sang Yang, Suwon (KR); Yeon-Taek Oh, Yongin (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 975 days.

(21) Appl. No.: 10/799,605

(22) Filed: Mar. 15, 2004

(65) Prior Publication Data

US 2005/0027396 A1 Feb. 3, 2005

(30) Foreign Application Priority Data

Aug. 1, 2003 (KR) .................. 10-2003-0053474

(51) Int. Cl.
  *B62D 51/04* (2006.01)
(52) U.S. Cl. .................. 180/8.2; 180/8.1; 180/901; 180/8.3; 180/8.5
(58) Field of Classification Search .................. 180/8.2, 180/8.1, 8.3, 8.5, 901
See application file for complete search history.

(56) References Cited

U.S. PATENT DOCUMENTS

| | | | | | |
|---|---|---|---|---|---|
| 4,266,627 | A | * | 5/1981 | Lauber | 180/8.3 |
| 5,372,211 | A | * | 12/1994 | Wilcox et al. | 180/8.2 |
| 5,515,934 | A | * | 5/1996 | Davis | 180/8.2 |
| 5,653,301 | A | * | 8/1997 | Andre | 180/8.2 |
| 6,112,843 | A | * | 9/2000 | Wilcox et al. | 180/345 |
| 6,431,296 | B1 | * | 8/2002 | Won | 180/9.32 |
| 7,246,671 | B2 | * | 7/2007 | Goren et al. | 180/8.2 |

FOREIGN PATENT DOCUMENTS

| | | |
|---|---|---|
| JP | 56-131462 | 10/1981 |
| JP | 58-157783 | 10/1983 |
| JP | 3-15087 | 2/1991 |
| JP | 4-134789 | 12/1992 |
| JP | 06-329055 | 11/1994 |

(Continued)

OTHER PUBLICATIONS

Chinese Office Action issued May 19, 2006, in Chinese Patent Application No. 200410032119.3

(Continued)

*Primary Examiner*—Lesley D. Morris
*Assistant Examiner*—Marlon A Arce Diaz
(74) *Attorney, Agent, or Firm*—Staas & Halsey LLP

(57) ABSTRACT

A mobile robot having wheels which maintain contact forces against a surface even when the mobile robot meets an obstacle on the surface and a body of the mobile robot is forced up against the obstacle. The mobile robot easily surmounts the obstacle on the surface, without requiring any sensors, any specific controller, any specific traveling unit to surmount over the obstacle, or any specific drive unit to drive the specific traveling unit. The mobile robot includes the body, the wheels connected with the body which move arcuately relative to the body, and a wheel guide unit coupled at a first end to the body and at a second end to a hub of each of the wheels. The wheel guide unit is contracted when the body is spaced apart from the surface on which the robot moves. However, the wheel guide unit expands to allow the wheel to be in contact with the surface when the body comes into contact with the surface.

16 Claims, 3 Drawing Sheets

FOREIGN PATENT DOCUMENTS

JP          2003-236776          8/2003

OTHER PUBLICATIONS

Japanese Office Action issued Jun. 27, 2006, in Japanese Patent Application No. 2004-093441.

Korean Publication No. 10-2003-0014502, "Mobile Robot for Inspecting Inside Pipe", filed Aug. 11, 2001.

Japanese Abstract 60-176871 filed Sep. 10, 1985.

Japanese Abstract 62-037287 filed Feb. 19, 1987.

* cited by examiner

MOBILE ROBOT

CROSS-REFERENCE TO RELATED APPLICATION

This application claims the benefit of Korean Patent Application No. 2003-53474, filed Aug. 1, 2003 in the Korean Intellectual Property Office, the disclosure of which is incorporated herein by reference.

BACKGROUND OF THE INVENTION

1. Field of the Invention

The present invention relates to mobile robots, and more specifically, to mobile robots which easily surmount obstacles on surfaces.

2. Description of the Related Art

Conventional mobile robots include wheeled robots and crawler robots. The wheeled robots have the advantages of high-speed mobility and high operational efficiency while moving on flat surfaces. However, most conventional wheeled robots are problematic in that the wheeled robots may fail to operate on surfaces having obstacles, such as thresholds and/or stairs.

An example of conventional crawler robots may be found in Japanese Patent Laid-open Publication No. Sho. 60-176871. As described in the Japanese patent, some mobile robots are equipped with specific traveling units, such as crawlers, in place of conventional wheels to surmount obstacles such as thresholds and/or stairs, while moving on surfaces by use of the traveling units. However, the mobile robots equipped with the specific traveling units, such as the crawlers, require a variety of sensors, specific controllers and specific drive units in the bodies of the robots, as well as the traveling units capable of surmounting obstacles on the surfaces. Therefore, the mobile robots having the specific traveling units, such as the crawlers, have reduced amounts of effective spaces in their bodies, so that it may be difficult to install some important elements required to perform desired functions in the robots' bodies. Additional problems of the mobile robots having specific traveling units, such as the crawlers, include excessive production costs and operational noise of the robots.

SUMMARY OF THE INVENTION

Accordingly, it is an aspect of the present invention to provide a wheeled mobile robot, of which wheels maintain contact forces against a surface even when the mobile robot must overcome an obstacle on the surface and a body of the mobile robot is forced up against the obstacle, and which thus easily surmounts the obstacle on the surface.

It is another aspect of the present invention to provide a wheeled mobile robot which does not require any sensors, any specific controller, any specific traveling unit to surmount an obstacle, or any specific drive unit to drive the specific traveling unit, in or on a body of the mobile robot, but which has a simple and small control unit to control the wheels, thus improving productivity and reducing production costs of manufacturing the mobile robot, and providing large effective spaces in the bodies of the mobile robots.

Additional aspects and/or advantages of the invention will be set forth in part in the description which follows and, in part, will be obvious from the description, or may be learned by practice of the invention.

The above and/or other aspects are achieved by providing a mobile robot including a body; a wheel assembled with the body to move upward and downward relative to the body; and a wheel guide unit coupled at a first end to the body and at a second end to a hub of the wheel. The wheel guide unit is maintained in a contracted state when the body is spaced apart from a surface on which the robot moves, and the wheel guide unit expands to allow the wheel to be in contact with the surface when the body comes into contact with the surface.

The mobile robot may further include a drive motor provided on the body and a power transmission unit to transmit power from the drive motor to the wheel.

The mobile robot may further include a sub-guide unit coupled to the wheel so as to rotate around a shaft of a drive motor.

In the mobile robot, the body may include a guide slot which guides a movement of the wheel guide unit, and the wheel guide unit may include an insert part which is inserted in the guide slot of the body.

The above and/or other aspects are achieved by providing a mobile robot including a body; a wheel assembled with the body to move upward and downward relative to the body; a power spring provided in the body; and a wheel guide unit coupled at a first end to the power spring and at a second end to a hub of the wheel. The wheel guide unit is maintained in a contracted state when the body is spaced apart from a surface on which the robot moves, and the wheel guide unit is rotated when the body comes into contact with the surface, thus allowing the wheel to be in contact with the surface.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
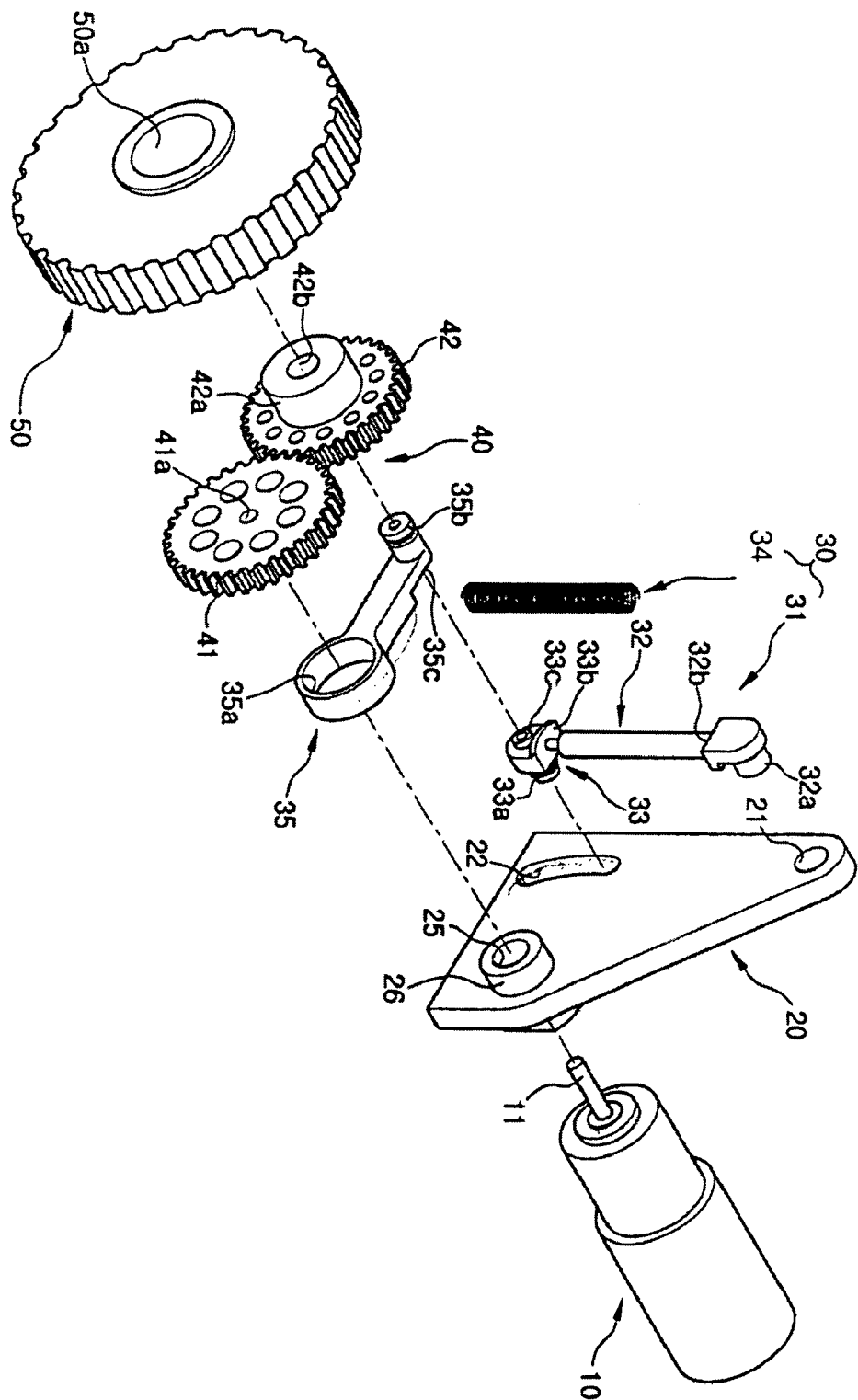
FIG. 1 is an exploded perspective view of a wheel control unit of a mobile robot, according to an embodiment of the present invention.

Reference will now be made in detail to embodiments of the present invention, examples of which are illustrated in the accompanying drawings, wherein like reference numerals refer to like elements throughout.

FIG. 1 is an exploded perspective view of a wheel control unit of a mobile robot according to an embodiment of the present invention. The mobile robot has at least one wheel 50, and the wheel control unit cooperates with the wheel 50 to drive and control the wheel 50 independently. As shown in FIG. 1, the wheel control unit of the mobile robot according to an embodiment of the present invention has a support bracket 20, a drive motor 10 and a wheel guide unit which includes a main guide unit 30 and a sub-guide unit 35 to guide a vertical movement of the wheel 50. The wheel control unit further has a power transmission unit 40.

The support bracket 20 constitutes a part of a body of the mobile robot, and has a locking hole 21, an arc-shaped guide slot 22 and an annular boss 26. The annular boss 26 defines a motor shaft hole 25 therein to receive a motor shaft 11 of the drive motor 10.

The drive motor 10 generates rotational power to rotate the wheel 50. In the present embodiment, a conventional electric motor, such as an AC motor or a step motor, may be used as the drive motor 10. The drive motor 10 has the motor shaft 11 which passes through the motor shaft hole 25 of the annular boss 26 of the support bracket 20 when the drive motor 10 is assembled with the support bracket 20.

The main guide unit 30 which guides the vertical movement of the wheel 50 has a spring guide 31 and a spring 34 which is a coil spring fitted over the spring guide 31 to be held thereby. The spring guide 31 has a cylinder 32 which forms an upper portion of the spring guide 31, and a piston 33 which forms a lower portion of the spring guide 31. A cylindrical coupling boss 32a is provided at an upper end of the cylinder 32 to couple the cylinder 32 to the locking hole 21 of the support bracket 10 while allowing the cylinder 32 to rotate around the locking hole 21 of the support bracket 20. An insert part 33a is provided at a lower end of the piston 33. The insert part 33a extends toward the support bracket 20. A locking boss 33c is provided at the lower end of the piston 33 while extending in a direction opposite to the insert part 33a. The locking boss 33c of the piston 33 engages with a second end of the sub-guide unit 35. First and second spring stop surfaces 32b and 33b to support both ends of the spring 34 of the main guide unit 30 are provided on the upper end and the lower end of the piston 33, respectively.

The sub-guide unit 35 which guides the vertical movement of the wheel 50, has the following structure. A first end of the sub-guide unit 35 has a coupling ring 35a which is fitted over the annular boss 26 of the support bracket 20 to be in contact with an outer surface of the annular boss 26. The first end of the sub-guide unit 35 thus rotates around the annular boss 26. The second end of the sub-guide unit 35 has a locking hole 35c and a gear support boss 35b. The locking hole 35c of the sub-guide unit 35 opens toward the main guide unit 30, while the gear support boss 35b extends in a direction opposite to the main guide unit 30. In this embodiment, the wheel control unit may effectively control the vertical movement of the wheel 50 by only the main guide unit 30, without the sub-guide unit 35. However, in the embodiment of FIG. 1, the sub-guide unit 30 which is securely assembled with the support bracket 20 desirably distributes a force imposed on both the power transmission unit 40 and the main guide unit 30, and enhances durability of the wheel control unit to lengthen the life span of the wheel control unit, regardless of repeated use of the mobile robot. Furthermore, when a power spring is coupled to the sub-guide unit 35, the sub-guide unit 35 may guide the vertical movement of the wheel 50 without the main guide unit 30.

The power transmission unit 40 includes a drive gear 41 and a driven gear 42. The drive gear 41 of the power transmission unit 40 has a shaft hole 41a at its center to receive the motor shaft 11. The driven gear 42 which engages with the drive gear 41 has an axle boss 42a at its center. A locking hole 42b is formed along the central axis of the axle boss 42a of the driven gear 42 so as to receive the gear support boss 35b of the sub-guide unit 35.

The wheel 50 has an open hub 50a at its center to receive the axle boss 42a of the driven gear 42.

The above-mentioned elements of the wheel control unit of the mobile robot are assembled as follows.

The drive motor 10 of FIG. 1 is mounted to the support bracket 20. In such a case, the motor shaft 11 is inserted in the motor shaft hole 25 of the annular boss 26 of the support bracket 20. The main guide unit 30 is fabricated by fitting the spring 34 over the cylinder 32 of the spring guide 31. The piston 33 is inserted into the cylinder 32. After fabricating the main guide unit 30, the cylindrical coupling boss 32a of the cylinder 32 is inserted into the locking hole 21 of the support bracket 10 so as to allow the cylinder 32 to rotate around the locking hole 21 of the support bracket 20. The insert part 33a of the piston 33 is inserted into the arc-shaped guide slot 22 of the support bracket 20. Thereafter, the coupling ring 35a of the sub-guide unit 35 is fitted over the annular boss 26 of the support bracket 20, while the locking hole 35c of the sub-guide unit 35 is fitted over the locking boss 33c of the piston 33. The drive gear 41 of the power transmission unit 40 is assembled with the motor shaft 11 by inserting the motor shaft 11 into the shaft hole 41a of the drive gear 41. The gear support boss 35b of the sub-guide unit 35 is inserted into the locking hole 42b of the axle boss 42a of the driven gear 42. Thereafter, the wheel 50 is assembled with the driven gear 42 by fitting the axle boss 42a of the driven gear 42 into the open hub 50a of the wheel 50.

The wheel control unit is operated as follows when the mobile robot surmounts an obstacle while moving on a surface, as shown in FIGS. 2 and 3A-3E.

Figure 2:
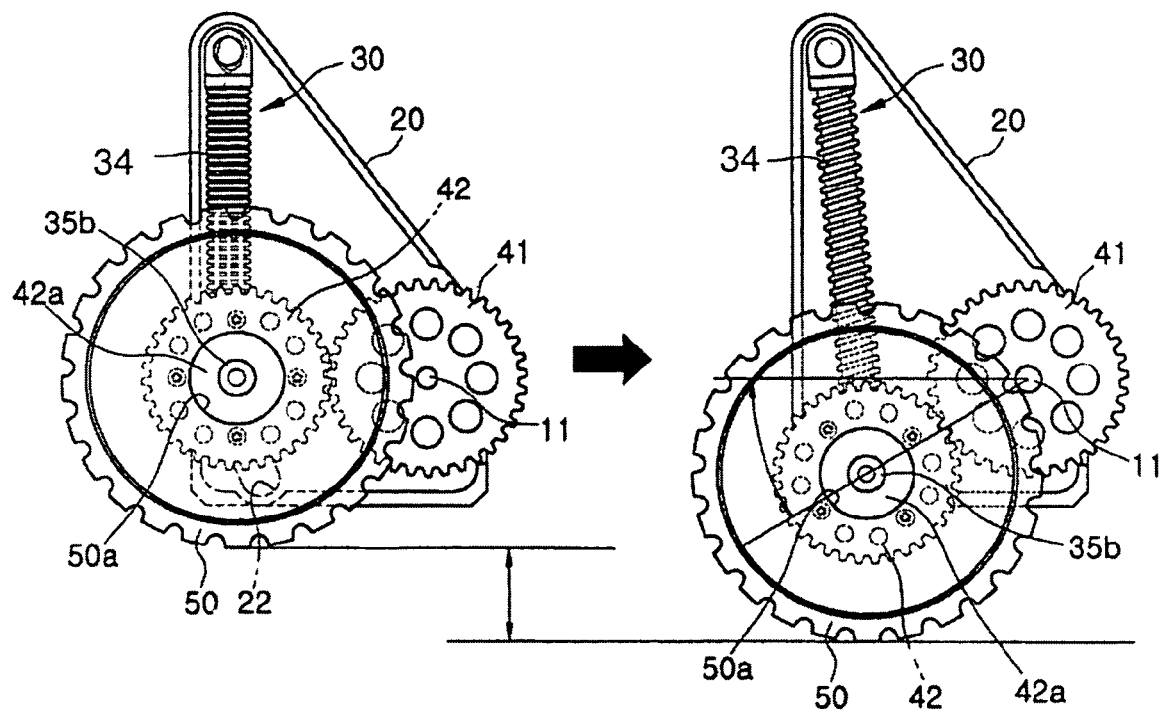
FIG. 2 is a front view showing an operation of the wheel control unit of the mobile robot of FIG. 1 when the robot surmounts an obstacle.

While the mobile robot normally moves on a flat surface, as shown in the left-side of FIG. 2, the spring 34 of the main guide unit 30 is compressed due to the weight of the mobile robot. However, when a lower surface of the body of the mobile robot comes into contact with an obstacle on the surface to raise the wheel 50 over the surface, the wheel 50 is released from a load which has been applied to the wheel 50 due to the weight of the mobile robot. The spring 34 expands as shown in the right-side figure of FIG. 2. In accordance with the expansion of the spring 34, the insert part 33a of the piston 33 moves downward along the arc-shaped guide slot 22 of the support bracket 29. In such a case, the insert part 33a of the piston 33 angularly moves around the motor shaft 11. Due to the downward movement of the insert part 33a of the piston 33 along the arc-shaped guide slot 22, the gear support boss 35b of the sub-guide unit 35, the center of the driven gear 42 and the hub of the wheel 50 which are coaxially coupled to the insert part 33a of the piston 33 move in the same direction as the insert part 33a. Therefore, the wheel 50 moves downward to come into contact with the surface, thus maintaining a contact force against the surface.

Figure 3A:
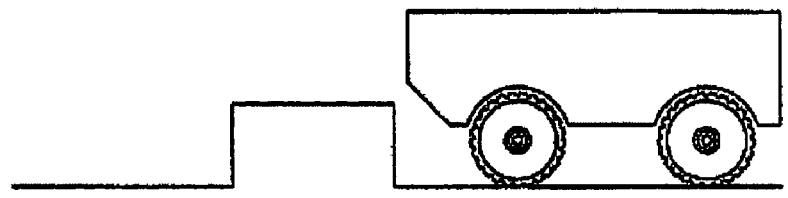
FIGS. 3A to 3E are side views showing a sequential motion of the mobile robot of FIG. 1 when the mobile robot surmounts an obstacle.
Figure 3B:
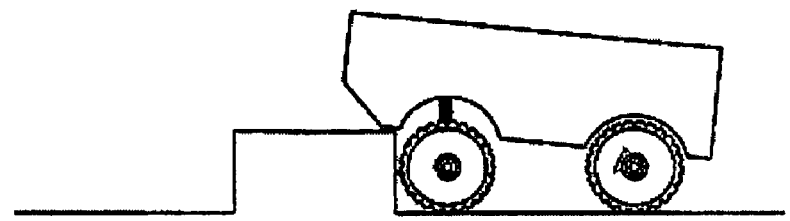
Figure 3C:
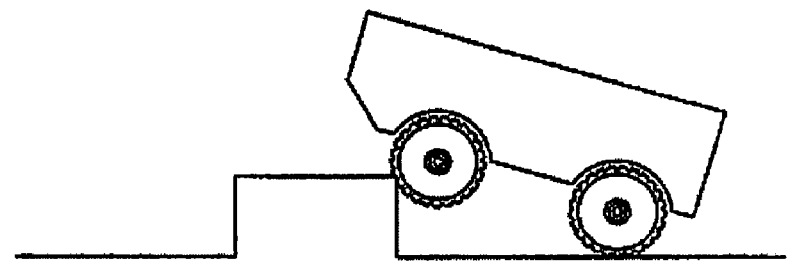
Figure 3D:
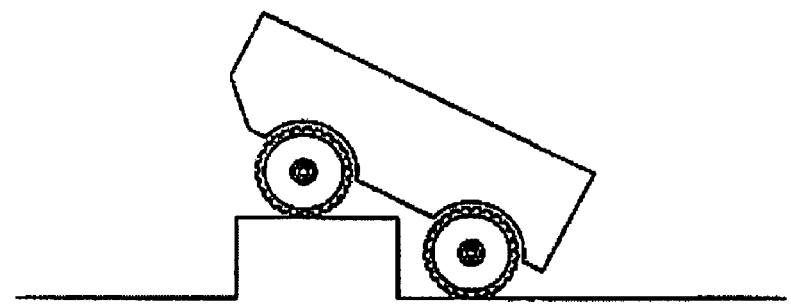
Figure 3E:
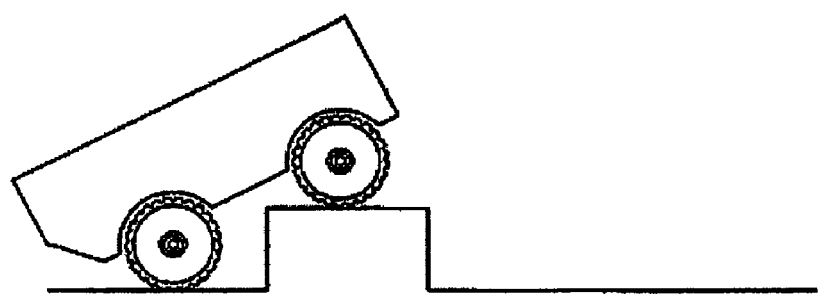

Accordingly, while the mobile robot normally moves on a flat surface as shown in FIG. 3A, the wheel 50 is maintained at a predetermined position relative to the body of the mobile robot, due to the weight of the mobile robot. However, when the mobile robot must overcome an obstacle on the surface, an inclined front portion of the body of the mobile robot is raised over the surface by the obstacle, as shown in FIG. 3B, so that the wheel 50 is released from a load which has been applied to the wheel 50 due to the weight of the mobile robot. When the load is removed from the wheel 50, the wheel 50 moves downward to maintain a contact force against the surface. Therefore, the mobile robot continuously moves forward on the surface while surmounting the obstacle, as shown in FIGS. 3C, 3D and 3E. While the mobile robot surmounts the obstacle as shown in FIGS. 3C, 3D and 3E, the spring 34 of the main guide unit 30 is compressed again due to the weight of the mobile robot, so that the wheel 50 moves upward to restore an original position relative to the body of the mobile robot. Every time the mobile robot meets obstacles while moving on the surface, the wheel 50 moves downward as described above, so that the mobile robot continuously moves forward on the surface while surmounting the obstacles without stopping.

As described above, a power spring may be used in place of the general-type coil spring 34, so as to move the wheel 50 downward to allow the mobile robot to surmount an obstacle.

When using a power spring in place of the general-type coil spring 34, the power spring is mounted at a first end to the support bracket 20, and at a second end to the cylindrical coupling boss 32a of the cylinder 32 of the main guide unit 30 or to a portion of the sub-guide unit 35. While the mobile robot normally moves on a flat surface, the power spring is maintained in a tightened state due to the weight of the mobile robot. Therefore, the wheel 50 is maintained at a particular position relative to the body of the mobile robot. However, when the mobile robot meets an obstacle and the wheel 50 is released from a load which has been applied to the wheel 50 due to the weight of the mobile robot, the power spring is loosened to allow the wheel guide unit and the wheel 50 to move downward, thus bringing the wheel 50 into contact with the surface. The mobile robot thus continuously moves forward on the surface while surmounting the obstacle.

Accordingly, a wheeled mobile robot, of which wheels maintain contact forces against a surface even when the mobile robot meets an obstacle on the surface and the body of the mobile robot is forced up against the obstacle, thus easily surmounts the obstacle on the surface.

The wheeled mobile robot does not require any sensors, any specific controller, any specific traveling unit to surmount an obstacle, or any specific drive unit to drive the specific traveling unit, in or on its body, but has a simple and small control unit to control the wheels, thus improving productivity and reducing production costs of manufacturing the mobile robot. The mobile robot further includes a large effective space in its body to contain important elements required to perform desired functions of the robot.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A mobile robot, comprising:
   a body;
   a drive motor connected with the body;
   a wheel connected with the body and configured to move in first and second directions relative to the body; and
   a wheel guide unit coupled at a first end thereof to the body and at a second end thereof to a hub of the wheel, the wheel guide unit being contracted when the body is spaced apart from a surface on which the mobile robot moves,
   wherein the wheel guide unit expands to allow the wheel to be in contact with the surface when the body comes into contact with the surface; and
   wherein the wheel guide unit further comprises a sub-guide unit coupled to the wheel so as to rotate around a shaft of the drive motor.

2. The mobile robot according to claim 1, further comprising:
   a power transmission unit configured to transmit power from the drive motor to the wheel.

3. The mobile robot according to claim 1, wherein the body includes a guide slot which guides a movement of the wheel guide unit, and
   wherein the wheel guide unit includes an insert part which is inserted in the guide slot of the body.

4. A mobile robot, comprising:
   a body;
   a drive motor connected with the body;
   a wheel connected with the body and which moves in first and second directions relative to the body;
   a power spring connected with the body; and
   a wheel guide unit coupled at a first end thereof to the power spring and at a second end thereof to a hub of the wheel, the wheel guide unit being contracted when the body is spaced apart from a surface on which the robot moves,
   wherein the wheel guide unit rotates, when the body comes into contact with the surface to allow the wheel to be in contact with the surface, and
   wherein the wheel guide unit further comprises a sub-guide unit coupled to the wheel so as to rotate around a shaft of the drive motor.

5. A mobile robot, comprising:
   a body having a first end and a first lower surface near the first end, the first lower surface being inclined from a horizontal plane of a bottom-most portion of the body;
   a wheel connected with the body and which moves in first and second directions relative to the body; and
   a wheel guide unit coupled at a first end thereof to the body and at a second end thereof to a hub of the wheel, the wheel guide unit being contracted when the body is spaced apart from a surface on which the mobile robot moves,
   wherein the wheel guide unit expands to allow the wheel to be in contact with the surface when the body comes into contact with the surface, and
   wherein the body includes a support bracket having a first locking hole, an arc-shaped guide slot and an annular boss.

6. The mobile robot according to claim 5, wherein the annular boss includes a motor shaft hole,
   wherein the drive motor includes a motor shaft disposed through the motor shaft hole.

7. The mobile robot according to claim 5, wherein the wheel guide unit includes a spring guide and a coil spring fitted over the spring guide.

8. The mobile robot according to claim 7, further comprising:
   a cylindrical coupling boss,
   wherein the spring guide includes a cylinder and a piston,
   wherein the cylindrical coupling boss is disposed at an upper end of the cylinder and couples the cylinder to the first locking hole, and
   wherein the cylinder is rotatable about the first locking hole.

9. The mobile robot according to claim 5, further comprising:
   a sub-guide unit coupled to the wheel; and
   a coupling ring fitted over the annular boss,
   wherein the coupling ring is in contact with an outer surface of the annular boss.

10. The mobile robot according to claim 9, wherein the sub-guide unit includes a second locking hole and a gear support boss, and
    wherein the second locking hole opens toward the wheel guide unit and the gear support boss extends in a direction opposite the wheel guide unit.

11. The mobile robot according to claim 9, wherein the sub-guide unit is connected with the support bracket, and
    wherein the sub-guide unit distributes a force on the power transmission unit and the wheel guide unit.

12. The mobile robot according to claim 7, wherein the power transmission includes a drive gear and a driven gear, the driven gear fixedly connected with the wheel and the drive gear connected with the drive motor, the drive gear and the driven gear being in meshed contact, wherein a part of the piston moves downward along the arc-shaped guide slot when the spring expands, and wherein a center of the driven gear and a center of the wheel move with the part of the piston along the arc-shaped guide slot when the spring expands, maintaining a contact force of the wheel against the surface.

13. The mobile robot according to claim 5, wherein the wheel is maintained at a particular height when the mobile robot is moving and when the surface is flat, wherein the first lower surface of the body raises the body when the first lower surface contacts a raised obstacle on the surface, removing a load of the weight of the mobile robot from the wheel, the wheel maintaining contact with the surface to surmount the obstacle.

14. A mobile robot comprising:

a body having a first end and a first lower surface near the first end, the first lower surface being inclined from a horizontal plane of a bottom-most portion of the body;

a wheel connected with the body and which moves in first and second directions relative to the body; and a wheel guide unit coupled at a first end thereof to the body and at a second end thereof to a hub of the wheel, the wheel guide unit being contracted when the body is spaced apart from a surface on which the mobile robot moves, wherein the wheel guide unit expands to allow the wheel to be in contact with the surface when the body comes into contact with the surface, wherein the wheel is maintained at a particular height when the mobile robot is moving and when the surface is flat, wherein the first lower surface of the body raises the body when the first lower surface contacts a raised obstacle on the surface, removing a load of the weight of the mobile robot from the wheel, the wheel maintaining contact with the surface to surmount the obstacle, and wherein the wheel moves toward the body and the normal position of the body is restored after the mobile robot surmounts the raised obstacle.

15. The mobile robot according to claim 5, wherein the wheel moves from a first distance relative to the body to a second distance relative to the body according to a variation in elevation of the surface.

16. The mobile robot according to claim 7, wherein the wheel extends from the body toward the surface, and wherein a load of a weight of the body is released from the wheel and the coil spring is loosened to allow the wheel to move in contact with the surface when the wheel contacts an obstacle on the surface.

* * * * *